(12) United States Patent
Thiede

(10) Patent No.: US 6,446,977 B1
(45) Date of Patent: Sep. 10, 2002

(54) NEO SEAL SOCKET SEALING RING

(75) Inventor: Anthony S. Thiede, deceased, late of Mission Viejo, CA (US), by Mary Ann Thiede, legal representative

(73) Assignee: Nor-Cal Aggregate Systems, San Rafael, CA (US)

(*) Notice: Subject to any disclaimer, the term of this patent is extended or adjusted under 35 U.S.C. 154(b) by 0 days.

(21) Appl. No.: 09/804,713

(22) Filed: Mar. 12, 2001

(51) Int. Cl.[7] .............................. F16J 15/53; B02C 2/00
(52) U.S. Cl. ..................... 277/501; 277/629; 241/216
(58) Field of Search ........................... 277/378, 501, 277/629, 503, 504, 505, 506, 508, 509; 241/37, 101.3, 207–216, 286, 244, 254

(56) References Cited

U.S. PATENT DOCUMENTS

| | | | | |
|---|---|---|---|---|
| 2,224,542 A | * | 12/1940 | Gruender et al. | 241/216 |
| 2,589,766 A | * | 3/1952 | Bernstein | 210/222 |
| 3,151,695 A | * | 10/1964 | Mintz | 180/68.3 |
| 3,432,174 A | * | 3/1969 | Teske et al. | 277/362 |
| 3,788,650 A | * | 1/1974 | Place | 277/378 |
| 3,990,490 A | * | 11/1976 | Voelz | 141/311 R |
| 4,192,472 A | * | 3/1980 | Johnson | 241/215 |
| 5,803,382 A | * | 9/1998 | Ganser et al. | 241/214 |
| 5,964,422 A | * | 10/1999 | Ruokonen et al. | 241/216 |

* cited by examiner

Primary Examiner—Anthony Knight
Assistant Examiner—Vishal Patel
(74) Attorney, Agent, or Firm—Larry D. Johnson; Craig M. Stainbrook; Johnson & Stainbrook, LLP

(57) ABSTRACT

A cone rock crusher for crushing rocks into sized aggregate material, including an improved protective seal that prevents external contaminants from entering the crusher's lubrication system. The seal is a rotating, self-cleaning, socket sealing ring with a magnetic safety release device which protects the flexible membrane seal from damage.

5 Claims, 5 Drawing Sheets

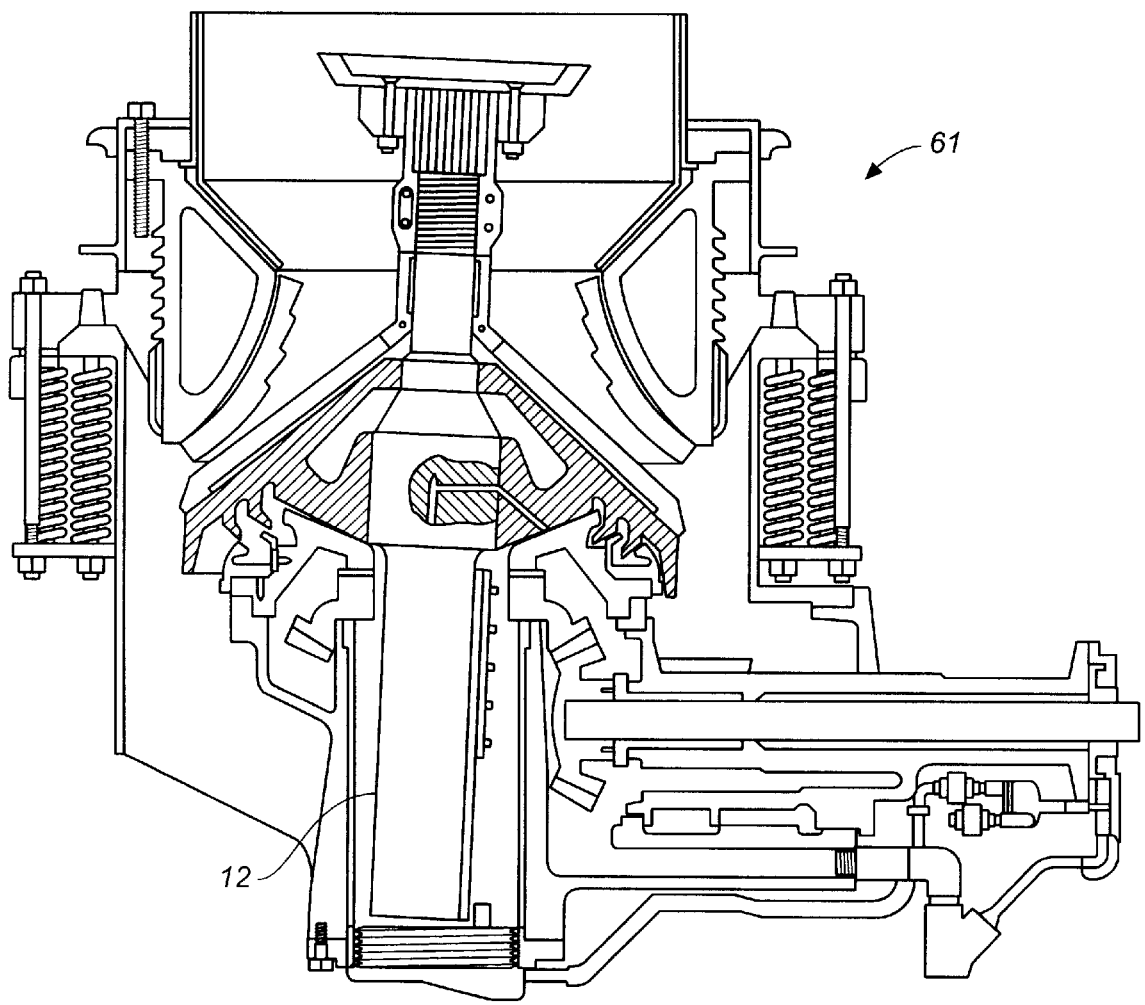
FIG._1 *(PRIOR ART)*

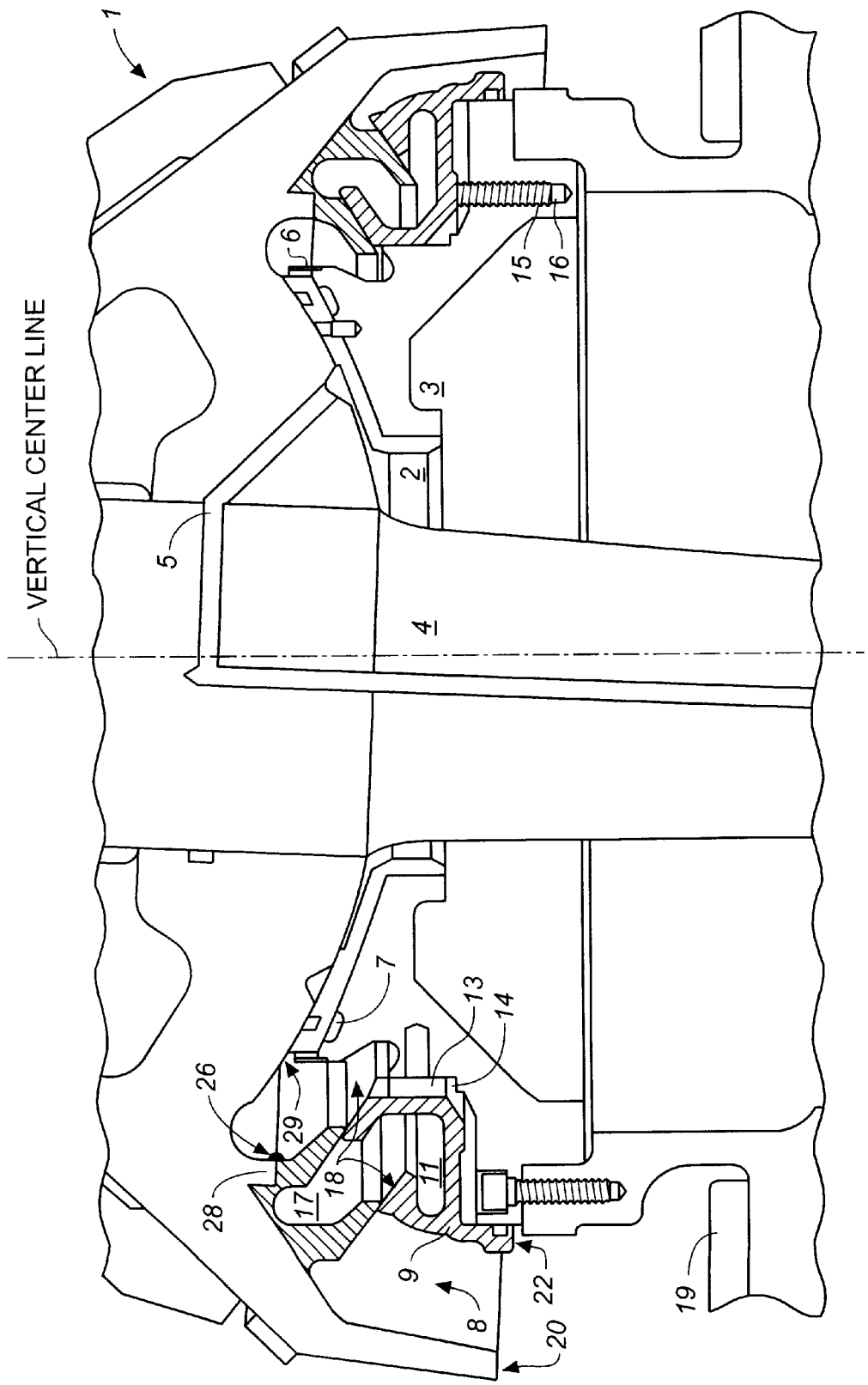
FIG._2 (PRIOR ART)

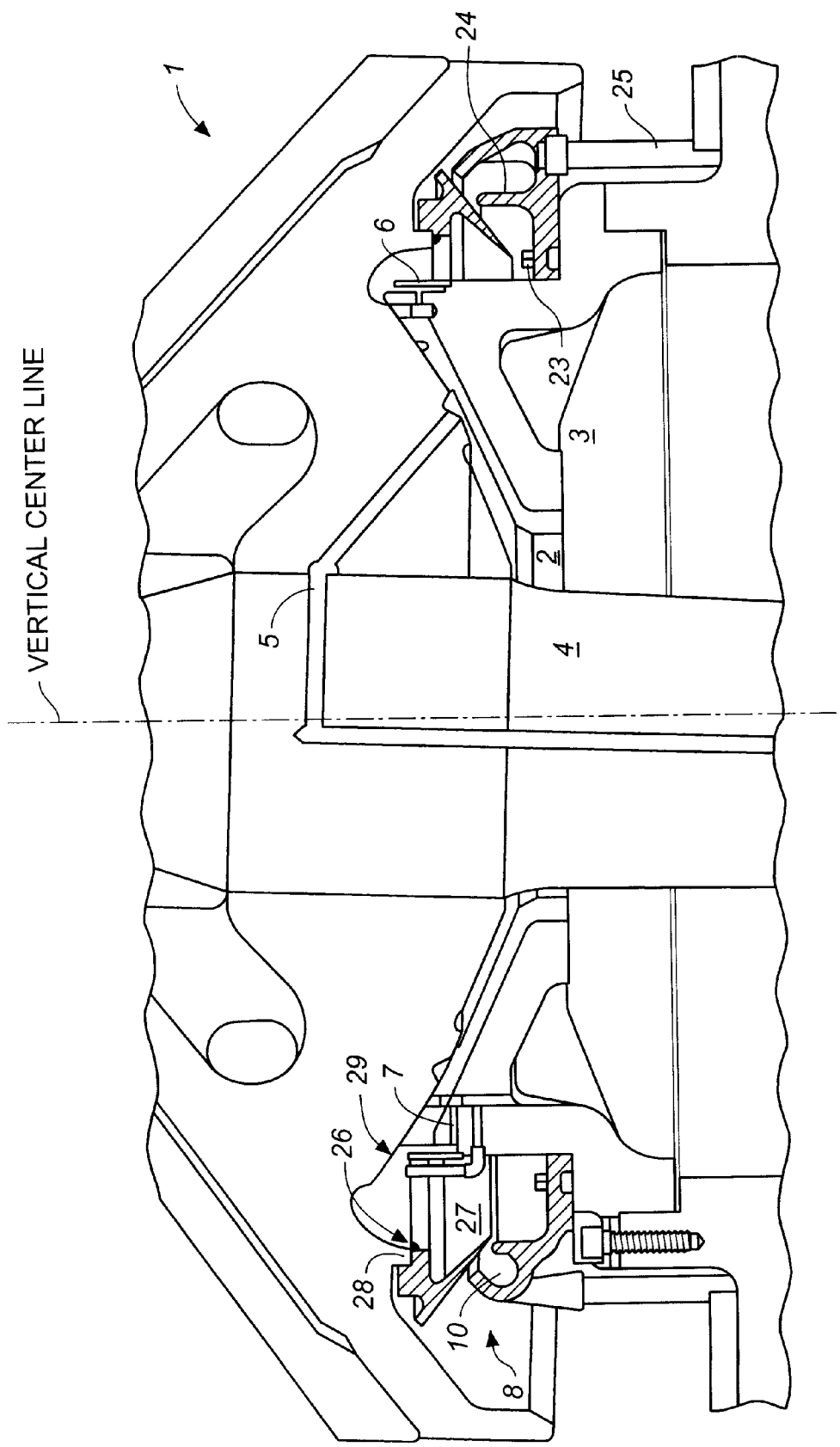
FIG._3 (PRIOR ART)

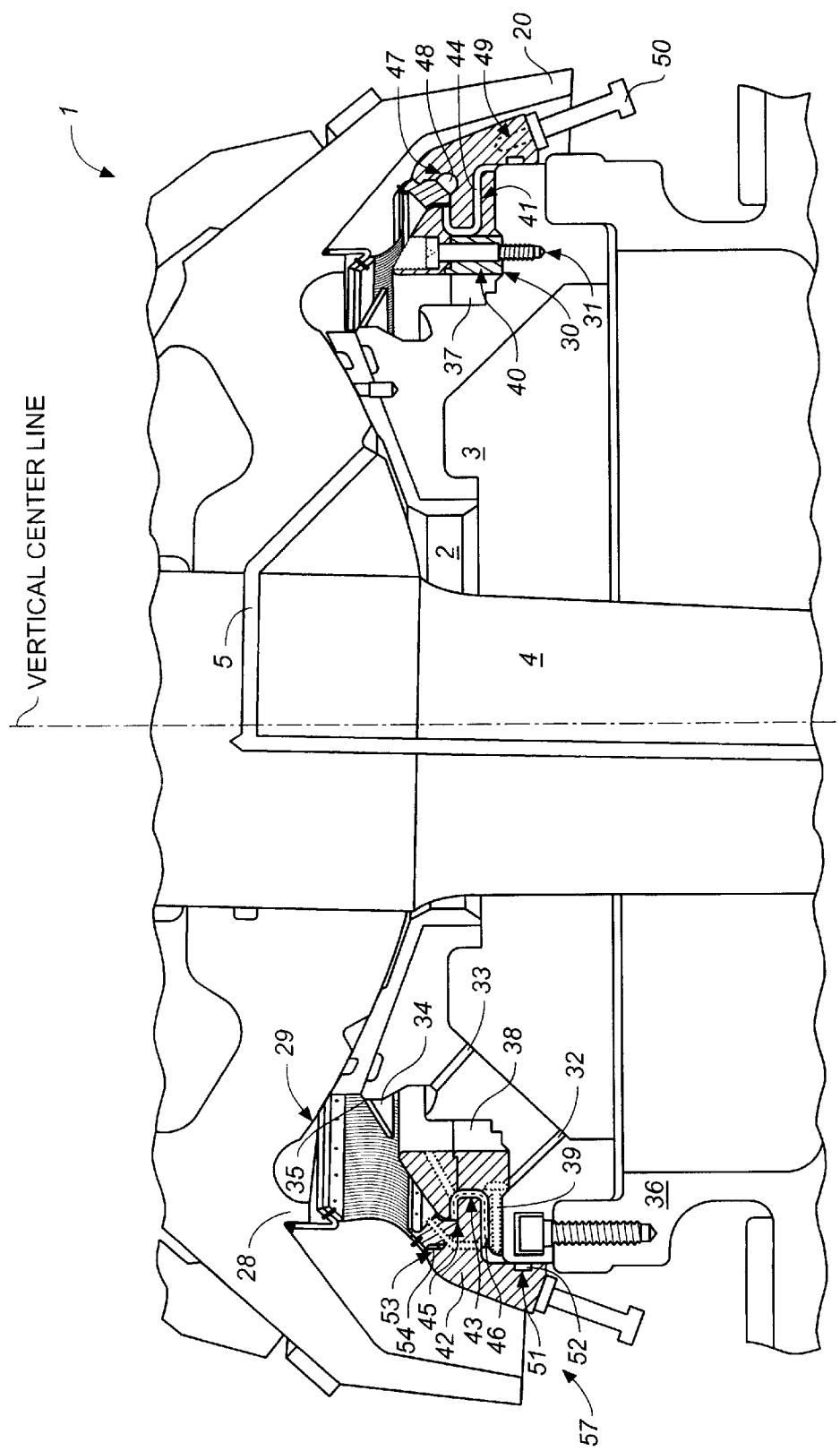
FIG._4

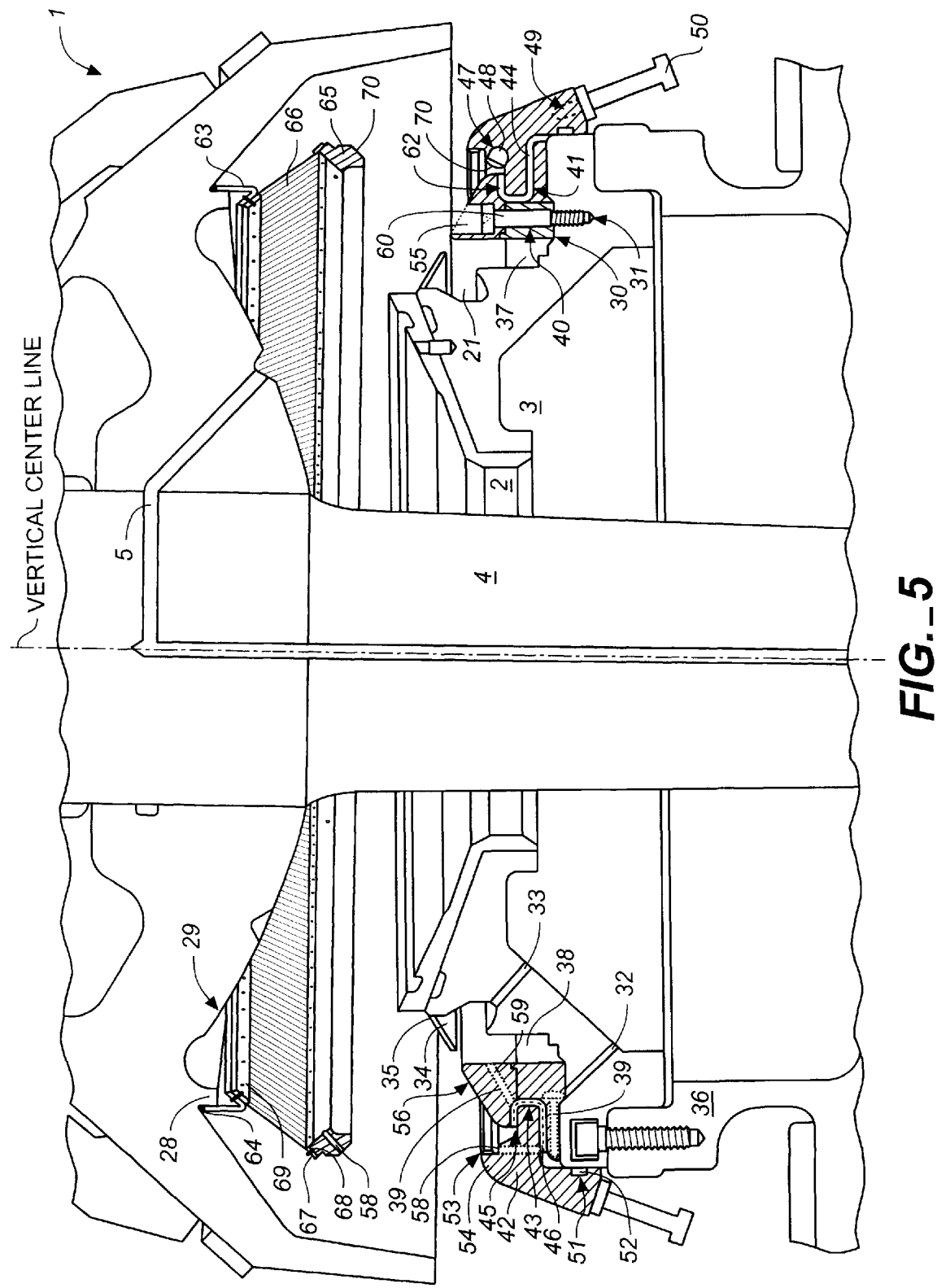
FIG._5

NEO SEAL SOCKET SEALING RING

BACKGROUND OF THE INVENTION

1. Field of the Invention

The present invention generally relates to rock crushers, and more specifically to a cone rock crusher for crushing rocks into sized aggregate material, including an improved protective seal that prevents external contaminants from entering the crusher's lubrication system.

2. Discussion of Prior Art

Crushers are used for reducing the size of rock. Cone are specifically designed to crush pre-sized material into small designated sizes of aggregate. As shown in FIG. 1 (prior art), a cone crusher 61 is cylindrical by design and requires a moving crushing head relative to a stationary bowl to accomplish its task. The head repetitively makes eccentric gyrating movements at a high rate of speed while simultaneously rotating slowly around a vertical axis. This latter movement is known as head-spin.

Head-spin is partly related to the contact, or more appropriately, the lack of contact on the stationary socket liner 2, which is mounted on top of the socket 3. The lubrication required for these movements is provided by pressurized oil rising through an oil passage 5 in the main shaft 4 and out through the head 1. Hydroplaning on a thin film of oil, the spherical underside 29 of the head 1 and the contouring mating surface of the socket liner 2 force the excess lubrication into an oil retaining ring 6. The oil retaining ring 6 is located on the upper outside of a socket 3 providing a return for the lubrication through drainage holes 7 within the socket 3 and back to a reservoir for re-circulation.

In the foregoing prior art design, the location between the movable head 1 and the stationary socket liner 2 is highly susceptible to contamination 8. (FIGS. 2, 3) Accordingly, the present invention is directed to this problem. The present invention provides an innovative seal to protect the lubricated bearing surfaces 12. The area modified is the location that houses the standard grease seal and water seal. (FIGS. 2, 3)

There are numerous manufacturers of cone crushers; all use different sealing methods within their machines. However, the cone crusher 61 of concern (FIGS. 1–3) utilizes these two methods. The standard seal utilizes a socket sealing ring 9 packed with grease. This design employs grease to capture and entrap dust, which then becomes embedded in this lubricant. The grease cavity 11 becomes saturated with entrapped particles which, with time, causes the erosion of the sealing unit. (FIG. 2)

The cone crusher water seal is designed to cause a pressure that flows through the seal area with a force of water to expel the dust out of the cavity. This non-contacting device utilizes a water chamber 10 bolted to the top of the socket 3. A quantity of pressurized water is introduced through a series of spray jets 23. The circular directional flow of continuous rising watered aids in removal of contaminants over a partition 24. Once the contaminants are on the other side, the contaminated water exits down drain outlets 25. This type of design has a non-contact counter-part welded in place around the underside of the head 1. The baffle ring 27 remains submerged within the rising water throughout.

This water seal concept at best is an effective seal for combating airborne contaminants. However, water contamination within the lubrication system is a regular occurrence in prior art designs. Uncontrollable factors such as fluctuating water pressure, humidity within the internal environment, erratic spray, hard water sediments, all hinder the effectiveness and efficiencies of prior art sealing systems, as exemplified by the system shown in FIG. 3.

As noted, the socket sealing ring 9 is packed with grease in an attempt to embed and entrap contaminants within the grease cavity 11 before reaching the internal lubricated bearing surfaces 12. The socket sealing ring 9 is held to place by keys 13 and key-ways 14 to prevent rotation while it is lifted off the socket base by a series of springs 15 and housing 16. The purpose of this lifting is to maintain permanent contact with its counterpart, the gyrating head sealing ring 17. There are inherent problems with the use of springs 25: they break inside of the housings 16, become stuck, and cause flotation to collapse. This ultimately creates a separation of the sealing mating surfaces 18, which then leads to contamination of the lubrication system. (FIG. 2) There is an additional problem in dealing with this area, where dirt and debris can be forced under the socket sealing ring 9. This contamination coming from the direction of the head skirt 20 eventually diminishes. The bottom edge of the socket sealing ring 22 is now exposed to the hydraulic-like forces of the debris which will cause not only oil contamination, but serious damage to both mating seals.

It would be desirable, therefore, to have an improved protective seal that prevents external contaminants from entering the crusher's lubrication system.

BRIEF DESCRIPTION OF THE DRAWINGS

FIG. 1 is a cross sectional side view in elevation of a prior art cone rock crusher;

FIG. 2 is, a cross sectional side view in elevation showing a prior art cone rock crusher grease and water seal systems;

FIG. 3 is another view of the systems of FIG. 2;

FIG. 4 is a cross sectional side view in elevation of the inventive seal apparatus to prevent contaminants from entering the lubricant bearing surfaces of a cylindrical cone rock crusher; and FIG. 5 is a detailed view of the apparatus of FIG. 4.

DETAILED DESCRIPTION OF A PREFERRED EMBODIMENT

The components of the inventive device are designed to fit cylindrical cone crushers commonly in use in industry. It is this shape which will best accommodate the sealing requirements. The majority of new components in this design are simple in nature and utilizing a vertical mill to accomplish the circular designs referred to herein.

Prior to installation of the improvement protective seal of the present invention, there will be modifications required to the head 1 and the socket 3 of the prior art. The head assembly 1 will require removal and elimination of the head sealing ring 17 (FIG. 2), or head baffle ring 27, (FIG. 3), depending on configuration. All that is required to remove the sealing ring 17, or the baffle ring 27, is an acetylene torch to cut along the welded seam 26. If removal of an integral head seal ring 17 is necessary, this can be accomplished by machining on a vertical mill. The main purpose of the removal of these components is to provide a cavity in which the newly designed components will be housed, and the shoulder 38 is an upper location at which the new invention will be secured around the circumference.

The socket area will also require the removal and elimination of the socket sealing ring 9, or the water chamber 10, depending on the design configuration of that particular machine. The socket 3 is temporarily removed for purposes of modification. During these modifications a vertical mill will be used to remove the oil retaining ring 6 and form register 30 on top of the socket base. In the event that a socket 3 housing is bolted down (i.e. water chamber 10), the existing threaded holes will require thread chasing with a tap. A socket 3 that houses the socket sealing ring 9 will require drilling, as well as tapping of new holes 31. At this point there will be a various number of additional new drain holes 32 drilled and overflow holes 33 for purposes of oil lubrication control. (FIGS. 4,5) The prior art drain holes 7, which were drilled during the manufacturing of the cone crusher 61 will be plugged.

A distribution ring 34 will then slip over the upper edge of the socket 3 and is welded 35 around the circumference of the old seam. At this point the modifications are complete and the socket 3 may be reinstalled into the crusher main frame 36. Preceding the socket modifications the two outer perpendicular bearing races 41 of the new base plate 37 are polished to a 62RMS finish. (FIGS. 4,5)

The base plate 37 is then lowered into the crusher until seated firmly on and within the newly modified mating register 30 of the socket 3. This register 30 provides concentric alignment, stability, and separation between the lubricating oil in the reservoir 38 and the drain holes 32 within the socket 3. The placement of the base plate 37 is critical in order to provide adequate flowing of the oil through second drain holes 39 which were staggered between the bolt holes 40. Next, a machined T-bone ring 42 is fitted with several new components.

Encompassing the inner surface 43 of the T-bone ring 42 is a bushing 44. The new "C" bushing 44, so called because of its shape, starts with a bar of square stock material having good lubricating qualities. It is rolled, machined, and separated into three equal segments. The outer separated edges are recessed and chambered. A liberal amount of epoxy is applied to the inner surfaces 45 of each "C" bushing 44 segment and securely fitted on the T-bone ring 42. Oil passages 46 for lubrication of the "C" busing 44 are now created between each segment due to their placement.

Within the upper perpendicular intersection of the T-bone ring 42 a predetermined number of the relatively large holes 47 are drilled in equal positions around the diameter. A liberal amount of epoxy is applied within the holes 47 and new cylinder shaped magnets 48 are firmly inserted in position flush with the adjacent surface. (FIGS. 4, 5) The T-bone ring 42 is now inverted, drilled, and tapped with four equally spaced holes 49 into the lower shoulder. Insertion of hex head bolts 50 are tightened to pre-established torque specifications. The hole diameter and angle is critical for the new sweeper bolts 50 to insure proper clearance between the main frame 36 and the gyrating head skirt 20 during operation. (FIG. 4) While the T-bone ring 42 is still inverted, a liberal amount of grease is applied within the groove 51 which houses the new lower piston ring 52. This lubricant will ensure an unsurpassable seal between the internal crusher lubrication and external contamination. (FIGS. 4, 5)

The piston ring is rolled from a bar of square stock material. It is attached along its overlapping seam, aligned and released within the respective groove. The T-bone ring is repositioned upright and the process is repeated for the new upper piston ring 54 and groove 53. The assembled T-bone ring 42 is now lowered into the crusher. Resistance from the lower piston ring 52, expanding over the chambered edge of the socket 3 is normal during this state of assembly. Upon installation, the "C" bushing 44 should virtually appear flush with the uppermost horizontal surface of the base plate 37. At this time the proper vertical bushing radial clearance is inspected with the use of a feeler gauge. (FIGS. 4, 5)

The new self-alignment ring 21 is centered and lowered on top of the base plate 37. The countersunk allen head bolt holes 55 require alignment, however, the location of the oil feed holes 59 are irrelevant. The allen head screws 60 are installed and tightened to torque specifications. The horizontal bushing thrust clearance is now gauged in between the top surface of the "C" bushing 44 and the alignment ring 21, more specifically, the third and final polished bearing race 62.

The inner walls of the base plate 37 and alignment ring 21 now create a lubrication reservoir 38 encompassing the socket 3. This reservoir 38 is pre-filled with the recommended crusher lubrication on initial installation. As the rising oil level flows down into the oil feed holes 59 the T-bone ring 42 will begin to rotate freely by hand. (FIG. 5)

As previously discussed, removal of the baffle ring 27 or sealing ring 17 exposes a shoulder 28 with a specific diameter encompassing the underside of the head 1. (FIGS. 2, 3) It is around this circumference that the new head attachment ring 63 is secured with a fillet weld 64. Inverting and bracing the head 1 will aid the ease of the assembly. (FIG. 5) The head attraction ring 65, manufactured specifically of steel, will provide the desired magnetism for installation and operation. The top circumference 65 is preferably relatively thin to affix the lower seam of the conical shaped new polymeric amide seal membrane 66 by means of a pre-drilled new attraction clamp ring 67 and rivets 68. The attraction ring 65 is then inverted and the upper seam of the polymeric amide membrane 66 is positioned over the new head attachment ring 63; then it is attached with its pre-drilled new attachment clamp ring 69 and rivets 68. The aforementioned polymeric amide seal membrane 66 can virtually be any material with exceptional flexibility, durability, and capacity to withstand the elements and protect from outside intrusion of contaminants. (FIG. 5)

The head 1 and newly attached components are lowered into the crusher in the conventional manner. No special tools are required to engage and seal the magnetic locking force 70. The flexible polymeric amide membrane 66 and the strategically machined surface angle 56 of the alignment ring 21 aid in centering the attraction ring into place. (FIG. 5)

The new Neo-Seal Socket Sealing Ring 57 is now completely sealed from outside contaminants and ready to receive lubrication. The crusher's pressurized lubrication system provides excess lubricant, dripped over the outer circumference of the socket liner 2 and supplying the Neo-Seal's 57 minimal operational requirements. (FIG. 4) The continuous supply dripping off the lower edge of the distribution ring 34 fills the reservoir 38. The oil level within the reservoir is designed not to drop below the opening of the oil feed holes 59; however, excessive oil is a possibility, and therefore, overflow 33 and vent holes 58 aid in expediting drainage. Once entering the oil feed holes 59, gravity aids the lubrication of the "C" bushing 44, after which the lubrication drains back for re-circulation through the mating drain holes 39/32 of the base plate 37 and socket 3. (FIG. 5)

Rotation of the T-bone ring 42 is strictly manipulated by the head-spin during normal and unrestricted operating conditions. However, if a sweeper bolt 50 encounters a restriction, the T-bone ring 42 will tend to manipulate the head-spin. Should this occur, the magnetic locking force 70 is powerful enough to impede any normal range of head-spin during a no-load situation; at this juncture, the operator should investigate further. Under a crushing load the head-spin is so powerful that the magnetic locking force 79 must disengage or drag to prevent damaging the polymeric amide membrane 66 or sweeper bolts 50.

What is claimed as invention is:

1. A seal apparatus to prevent contaminants from entering lubricant bearing surfaces of a cylindrical cone rock crusher, said seal apparatus comprising:
   a head assembly (1) bearing a generally circular membrane (66);
   a head attraction ring (65) attached to said membrane;
   a socket assembly (3) bearing a circumferential ring (42);
   a plurality of magnets (48) disposed about said circumferential ring, wherein said head attraction ring is magnetically engaged to said circumferential ring when the cone crusher is under no load, but disengages from said circumferential ring when the cone crusher is under a crushing load.

2. The seal apparatus of claim 1 wherein said circular membrane (66) comprises a lubricant impermeable, flexible material.

3. The seal apparatus of claim 1 wherein said circular membrane (66) comprises a polymeric amide seal.

4. The seal apparatus of claim 1 wherein said circular membrane (66) is affixed to said head assembly (1) with an attachment ring (63).

5. The seal apparatus of claim 1 wherein said circumferential ring (42) is adapted for rotation about said socket assembly (3).

\* \* \* \* \*